(12) United States Patent
Chang et al.

(10) Patent No.: US 8,749,551 B2
(45) Date of Patent: Jun. 10, 2014

(54) SYSTEM AND METHOD FOR CONSTRUCTING TRIANGULAR MESH SURFACE OF POINT CLOUD

(75) Inventors: Chih-Kuang Chang, Taipei Hsien (TW); Xin-Yuan Wu, Shenzhen (CN); Min Wang, Shenzhen (CN); Wen-Duan Hu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 854 days.

(21) Appl. No.: 12/882,152

(22) Filed: Sep. 14, 2010

(65) Prior Publication Data

US 2011/0157176 A1   Jun. 30, 2011

(30) Foreign Application Priority Data

Dec. 29, 2009   (CN) .......................... 2009 1 0312560

(51) Int. Cl.
*G06T 17/20* (2006.01)

(52) U.S. Cl.
USPC ........................................................ 345/423

(58) Field of Classification Search
None
See application file for complete search history.

(56) References Cited

U.S. PATENT DOCUMENTS

| | | | | |
|---|---|---|---|---|
| 5,736,987 A | * | 4/1998 | Drucker et al. ............... | 345/420 |
| 6,392,647 B1 | * | 5/2002 | Migdal et al. ................. | 345/423 |
| 6,476,803 B1 | * | 11/2002 | Zhang et al. .................. | 345/419 |
| 2001/0013866 A1 | * | 8/2001 | Migdal et al. ................. | 345/423 |
| 2008/0218509 A1 | * | 9/2008 | Voth .............................. | 345/419 |

OTHER PUBLICATIONS

OuYang, Daoshan, and Hsi-Yung Feng. "On the normal vector estimation for point cloud data from smooth surfaces." Computer-Aided Design 37.10 (2005): 1071-1079.*
Duan, Ye, and Hong Qin. "A subdivision-based deformable model for surface reconstruction of unknown topology." Graphical Models 66.4 (2004): 181-202.*
Gao et al., Periodical"A Region-growing Algorithm for Triangular Mesh Surface Reconstruction from Point-cloud Data" Journal of Jinlin College, 2008, col. 46 No. 3, see Abstract.
Mingzhen Zhang, Thesis"Research on Surface reconstruction of discrete points Based on Delaunay Triangulation" Thesis database of Master degree in China ,2006,see Abstract.

* cited by examiner

*Primary Examiner* — Daniel Hajnik
(74) *Attorney, Agent, or Firm* — Novak Druce Connolly Bove + Quigg LLP (57) ABSTRACT

A method for constructing a triangular mesh surface of a point cloud includes constructing triangles according to point cloud data, determining seed triangles from the constructed triangles. The method further includes selecting triangles that share a side with a determined seed triangle from the constructed triangle, determining a specific triangle having the biggest dihedral angle with the determined seed triangle and the biggest angle opposing the shared side of the determined seed triangle. The method also includes repairing holes formed by the specific triangles if the all specific triangles have been determined, adjusting a normal vector of each specific triangle, and outputting a triangular mesh surface constructed by the adjusted triangle.

15 Claims, 10 Drawing Sheets

SYSTEM AND METHOD FOR CONSTRUCTING TRIANGULAR MESH SURFACE OF POINT CLOUD

BACKGROUND

1. Field of the disclosure

Embodiments of the present disclosure relate to point cloud processing, and more particularly to a system and method for constructing a triangular mesh surface of a point cloud.

2. Description of Related Art

In general, a mesh of a point cloud of an object can be triangular, quadrangular or polygonal, among which a triangular mesh approximate (both locally and globally) the object with the highest-accuracy. Delaunay is a technique to construct a triangular mesh surface of the point cloud. Even though Delaunay discloses how to construct the triangular mesh surface, however it needs to perform many calculations. As a result, it is difficult, complex and time-consuming to offer a solution to overcome the above problem.

DETAILED DESCRIPTION

All of the processes described below may be embodied in, and fully automated via, functional code modules executed by one or more general purpose computers or processors. The code modules may be stored in any type of computer-readable medium or other computer storage device. Some or all of the methods may alternatively be embodied in specialized computer hardware.

Figure 1:
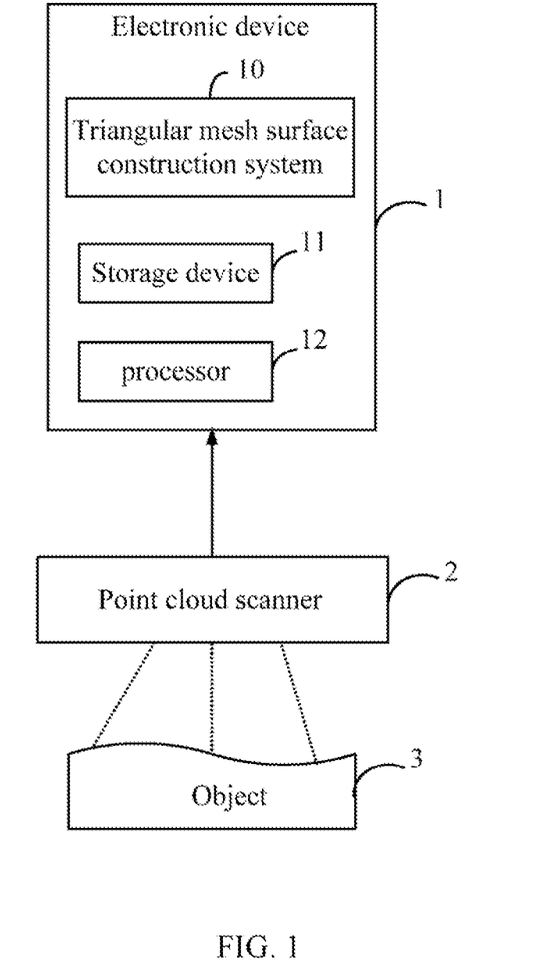
FIG. 1 is a block diagram of one embodiment of an electronic device including a triangular mesh surface construction system.

FIG. 1 is a block diagram of one embodiment of an electronic device 1 including a triangular mesh surface construction system 10. The electronic device 1 is connected to a point cloud scanner 2, which is used to scan a surface of an object 3 to obtain point cloud data, such as three-dimensional coordinates of each point in the point cloud, a total number of points in the point cloud. By utilizing the triangular mesh surface construction system 10, a high quality triangle can be constructed according to the point cloud data, and a high quality triangular mesh surface can be constructed based on the constructed triangles.

The electronic device 1 further includes a storage device 11 and a processor 12. The storage device 11 may store various kinds of data, such as point cloud data obtained from the point cloud scanner 2, for example.

The processor 12 executes one or more computerized operations of the electronic device 1 and other applications, to provide functions of the electronic device 1.

Figure 2:
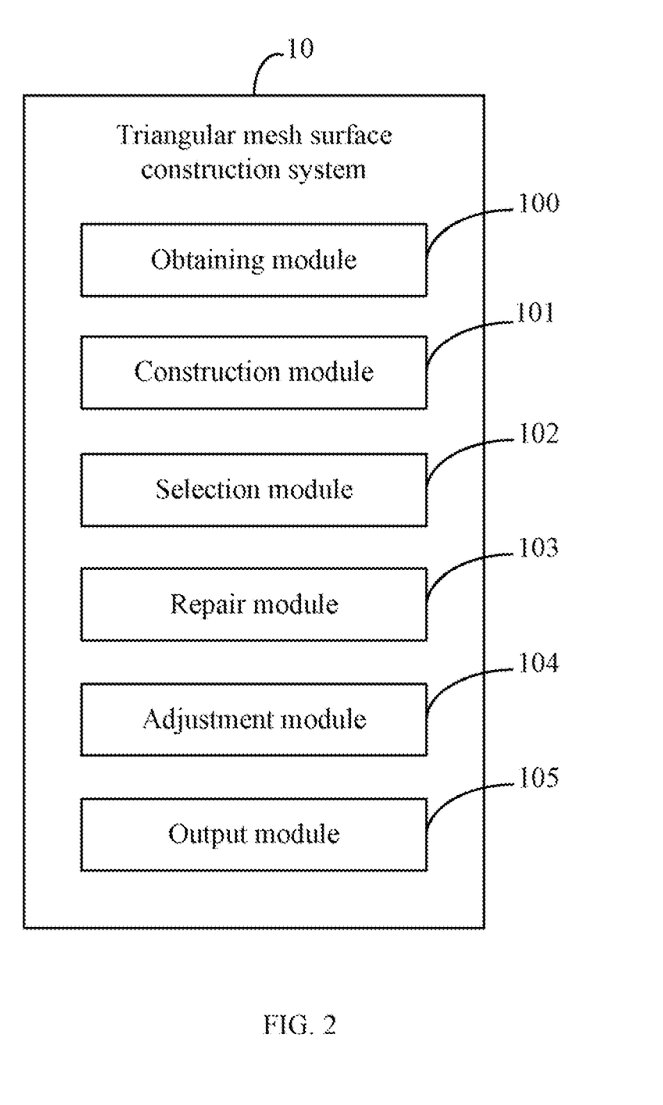
FIG. 2 is a block diagram of one embodiment of the triangular mesh surface construction system in the FIG. 1.

FIG. 2 is a block diagram of one embodiment of the triangular mesh surface construction system 10 in the FIG. 1. In one embodiment, the triangular mesh surface construction system 10 includes an obtaining module 100, a construction module 101, a selection module 102, a repair module 103, an adjustment module 104, and an output module 105. The modules 100, 101, 102, 103, 104, and 105 may comprise one or more computerized codes to be executed by the processor 12 to perform one or more operations of the triangular mesh surface construction system 10.

The obtaining module 100 obtains point cloud data from the point cloud scanner 2. In some embodiments, the point cloud data includes three-dimensional coordinates of each point in the point cloud, and a total number of points in the point cloud.

Figure 4A:
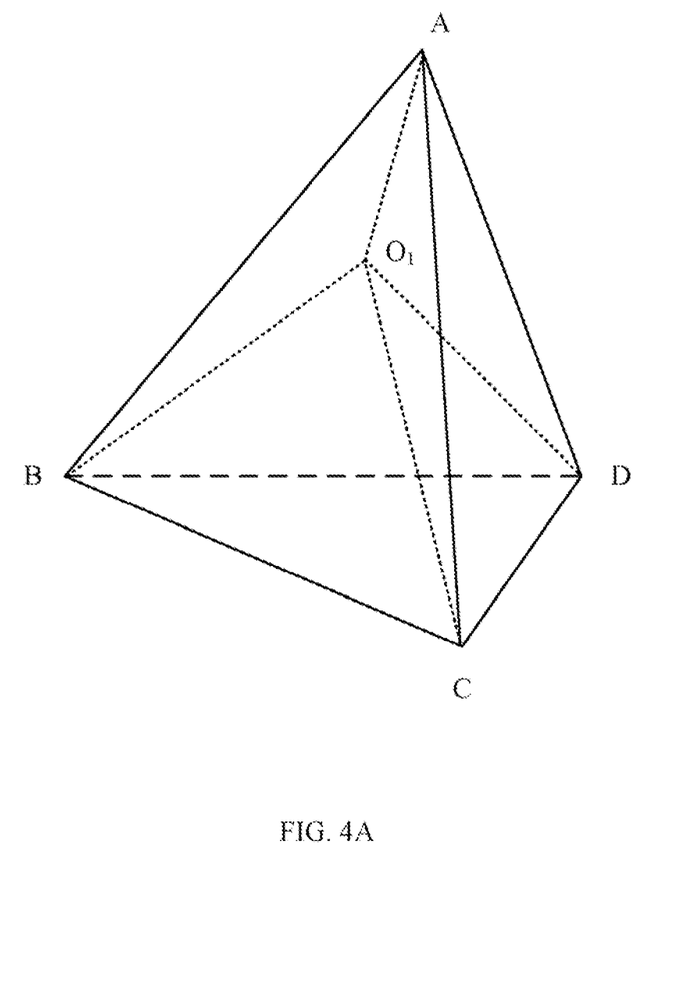
FIG. 4a-4c illustrate constructing triangles.
Figure 4B:
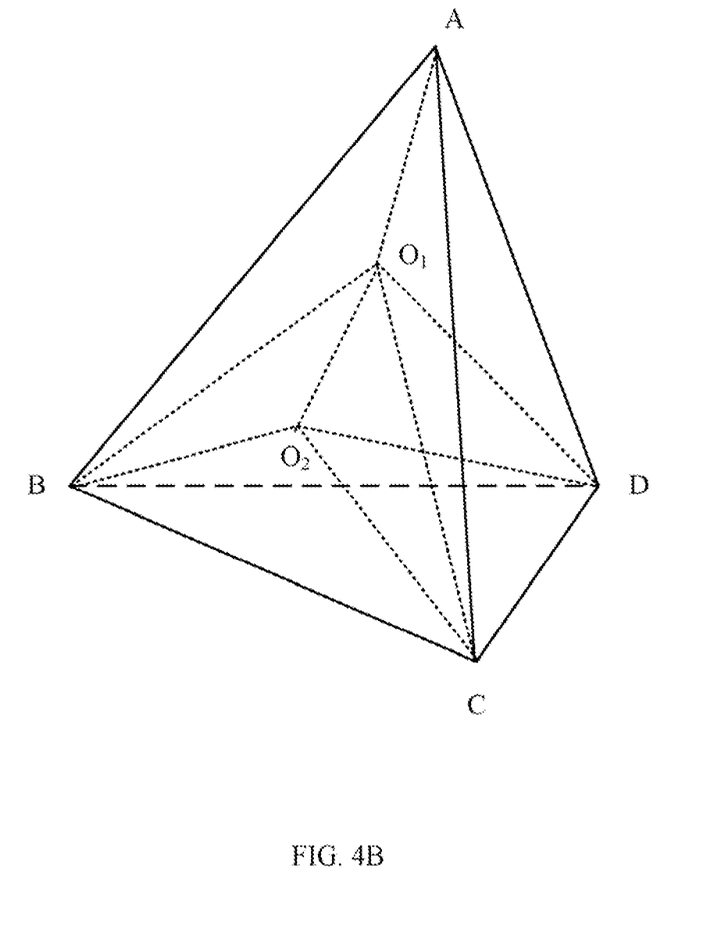
Figure 4C:
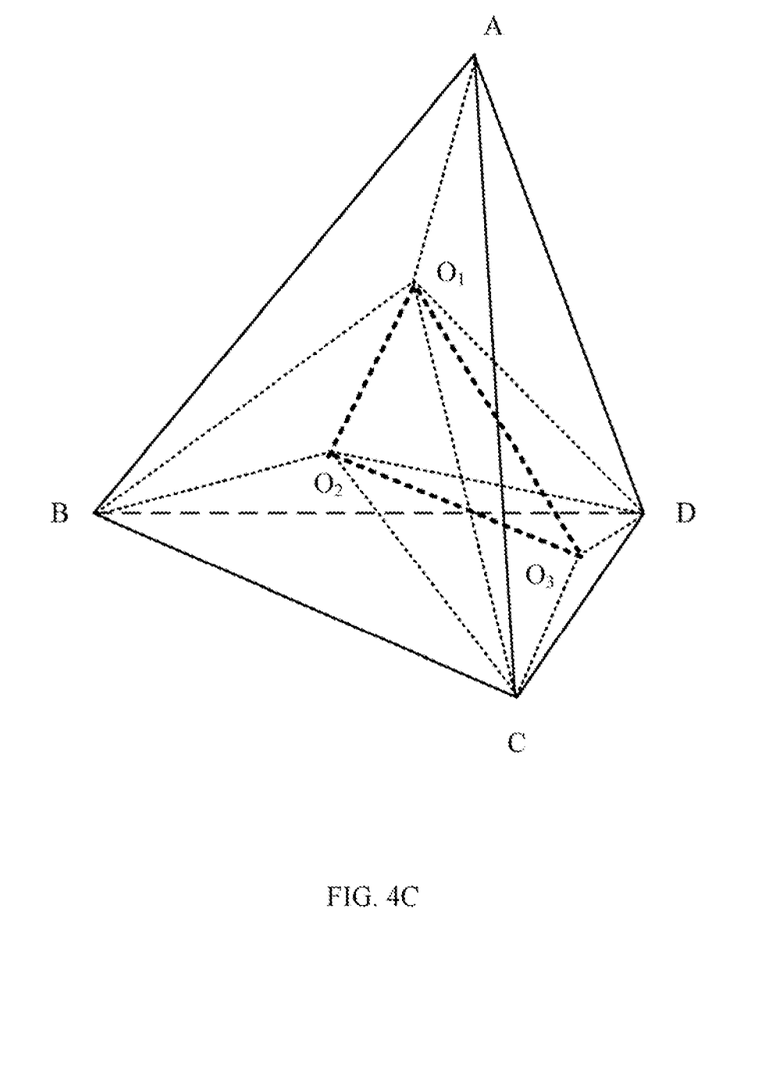

The construction module 101 constructs triangles according to the point cloud data. In some embodiments, the construction module 101 constructs a cubical quad containing all the point cloud data first. Next, the construction module 101 constructs a circumscribed tetrahedron around the cubical quad. Last, the construction module 101 inserts each point of the point cloud into the tetrahedron according to the three-dimensional coordinates of each point, and draws a line to connect each point in the tetrahedron with each vertex of the tetrahedron. As shown in FIG. 4a, the construction module 101 inserts a point $O_1$ into a tetrahedron ABCD according to the three-dimensional coordinates of the point $O_1$, and draws lines to connect the point $O_1$ with vertexes A, B, C, and D of the tetrahedron ABCD. As shown in FIG. 4b, the construction module 101 inserts a point $O_2$ into a tetrahedron ABCD according to the three-dimensional coordinates of the point $O_2$, and draws lines to connect the point $O_2$ with vertexes $O_1$, B, C, and D of tetrahedron $O_1$BCD. As shown in FIG. 4c, the construction module 101 inserts a point $O_3$ into a tetrahedron ABCD according to the three-dimensional coordinates of the $O_3$, draws lines to connect the point $O_3$ with vertexes $O_1$, $O_2$, C, and D of a tetrahedron $O_1O_2CD$, a triangle $O_1O_2O_3$ is the constructed triangle.

The selection module 102 determines a triangle from the constructed triangles as a first seed triangle, and further determines other seed triangles in sequence according to a seeded region growing algorithm based on the first seed triangle. In some embodiments, the first seed triangle may be a triangle including a vertex having a maximum X axis coordinate, a triangle including a vertex having a vertex having a maximum Y axis coordinate, or a triangle including a vertex having a vertex having a maximum Z axis coordinate.

Figure 5:
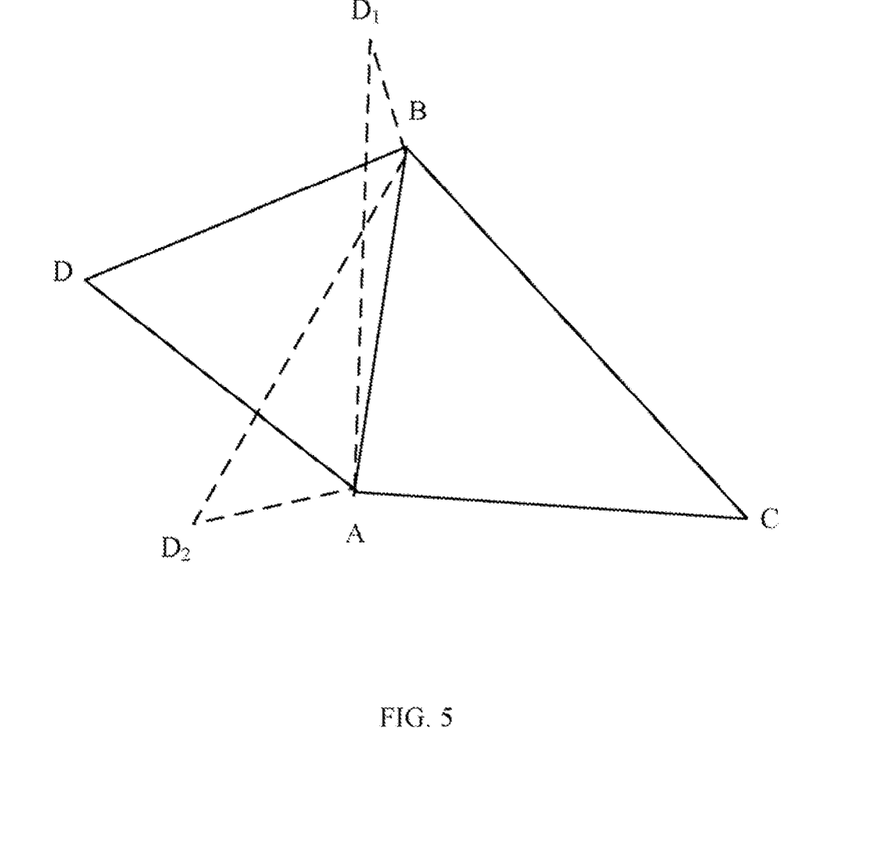
FIG. 5 illustrates determining a specific triangle that having the biggest dihedral angle with a seed triangle and the biggest angle opposing a shared side of the seed triangle.

The selection module 102 also selects triangles that share a side with the first seed triangle from the constructed triangles. For example, as shown in FIG. 5, a triangle ABC is determined as a seed triangle, a triangle ABD, a triangle $ABD_1$, and a triangle $ABD_2$ share a side (AB) with the seed triangle ABC.

For simplification, the first seed triangle is selected to be an example for describing corresponding processing, however, it should be understood that other seed triangle also may be processed as the processing on the first seed triangle. The selection module 102 also calculates a dihedral angle between each of the selected triangles and the first seed triangle, calculates an angle of each of the selected triangles opposite to the shared side of the first seed triangle.

The selection module 102 also determines a specific triangles that having the biggest dihedral angle with the first seed triangle and the biggest angle opposite to the shared side of the first seed triangle. As shown in FIG. 5, a dihedral angle between the triangle ABD and the seed triangle ABC is 170°, a dihedral angle between the triangle ABD1 and the seed triangle ABC is 130°, a dihedral angle between the triangle ABD2 and the seed triangle ABC is 110°. That is, the triangle ABD has the biggest dihedral angle with the seed triangle ABC. An angle <ADB of the triangle ABD opposite to the shared side AB is 58°, an angle <AD$_1$B of the triangle ABD$_1$ opposite to the shared side AB is 40°, an angle <AD$_2$B of the triangle ABD$_2$ opposite to the shared side AB is 30°. The triangle ABD has the biggest angle opposite to the shared side AB of the seed triangle ABC. Thus, the triangle ABD is the specific triangle having the biggest dihedral angle with the seed triangle ABC, and the biggest dihedral angle is opposite to the shared side of the seed triangle ABC. By repeating above mentioned processing, a plurality of specific triangles may be determined.

The selection module 102 also determines whether all specific triangles have been determined.

Figure 6:
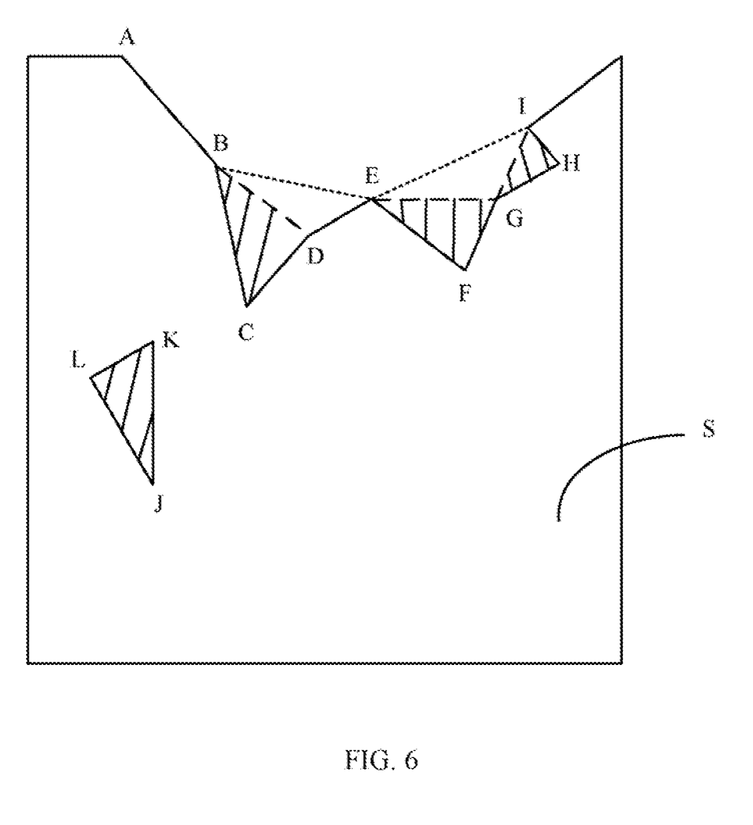
FIG. 6 illustrates repairing holes formed by the specific triangles.

If all specific triangles have been determined, the repairing module 103 repairs holes formed by the specific triangles. The repairing module 103 makes a circumscribed circle around each of the specific triangles includes no other points except three vertexes of the each of the specific triangles. The repairing module 103 further makes each side of each of the specific triangles merely shares with another specific triangle. For example, as shown in FIG. 6, "S" is a curved surface constructed by the specific triangles, boundaries of the "S" are ABCDEFGHI, JKL. In one embodiment, the repairing module 103 fills a hole JKL, draws a line to connect a point B and a point D, draws a line to connect a point E and a point G, draws a line to connect a point G and a point H.

Figure 7A:
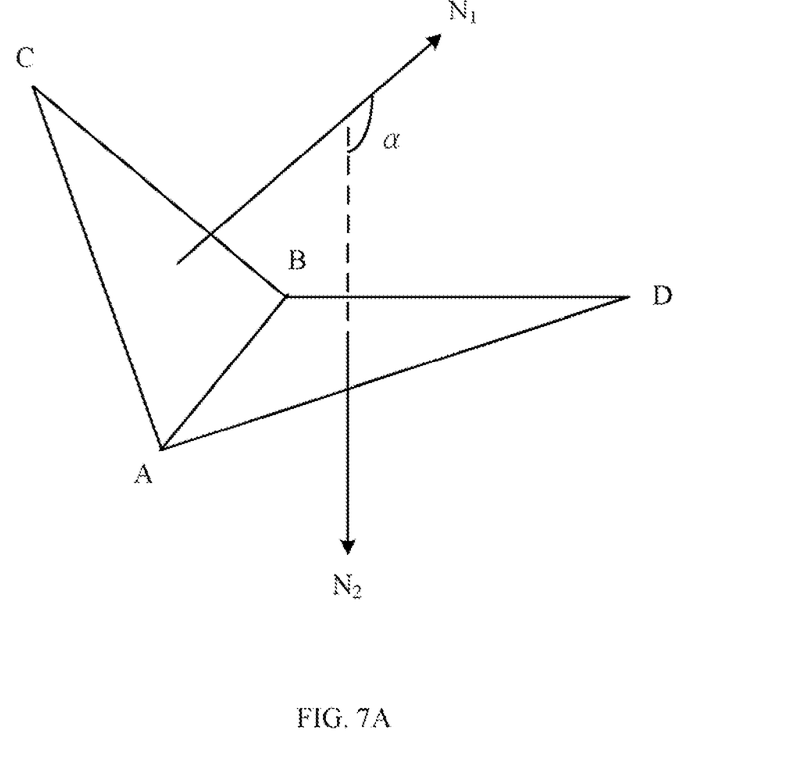
FIG. 7a-7b illustrate adjusting normal vectors of a pair of adjacent triangles.
Figure 7B:
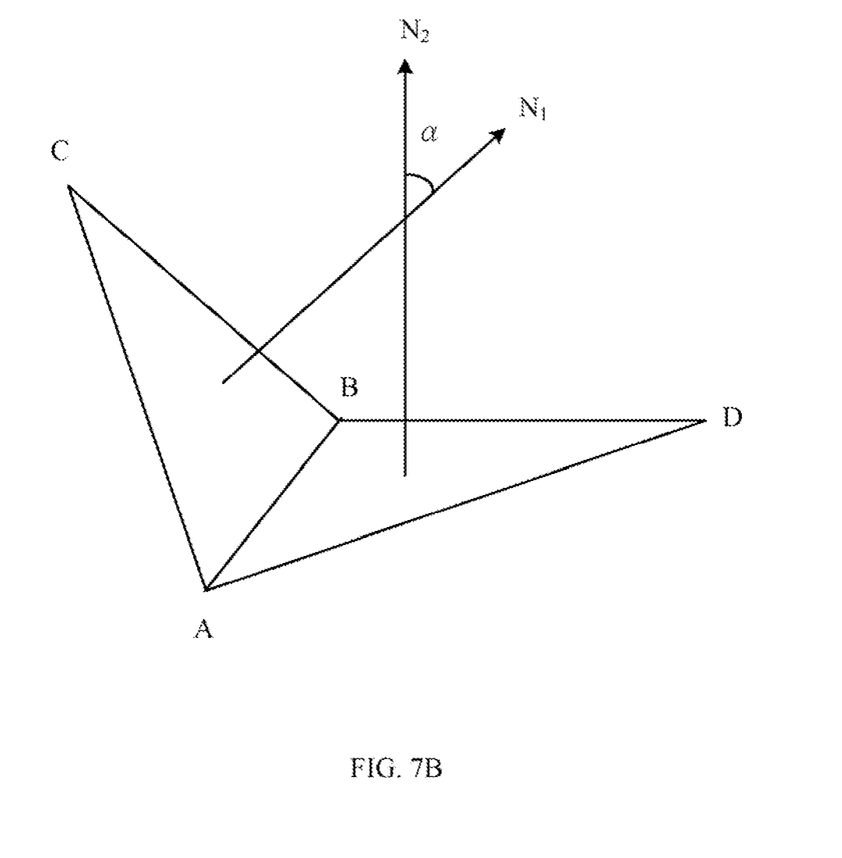

The adjustment module 104 adjusts a normal vector of each of the specific triangles according to a principle that an angle between two normal vectors of each pair of adjacent triangles is less than a preset angle. In one embodiment, the preset angle is 90°. As shown in FIG. 7a, N1 is a normal vector of a triangle ABC, N2 is a normal vector of a triangle ABD, an angle α between the N1 and N2 is more than 90°, a direction of N1 is a forward direction, a direction of N2 is an opposite direction. The adjustment module 104 adjusts a direction of N2 to the forward direction, as shown in FIG. 7b, an angle α between the N1 and adjusted N2 is less than 90°.

The output module 105 outputs a triangular mesh surface constructed by the adjusted specific triangles.

Figure 3:
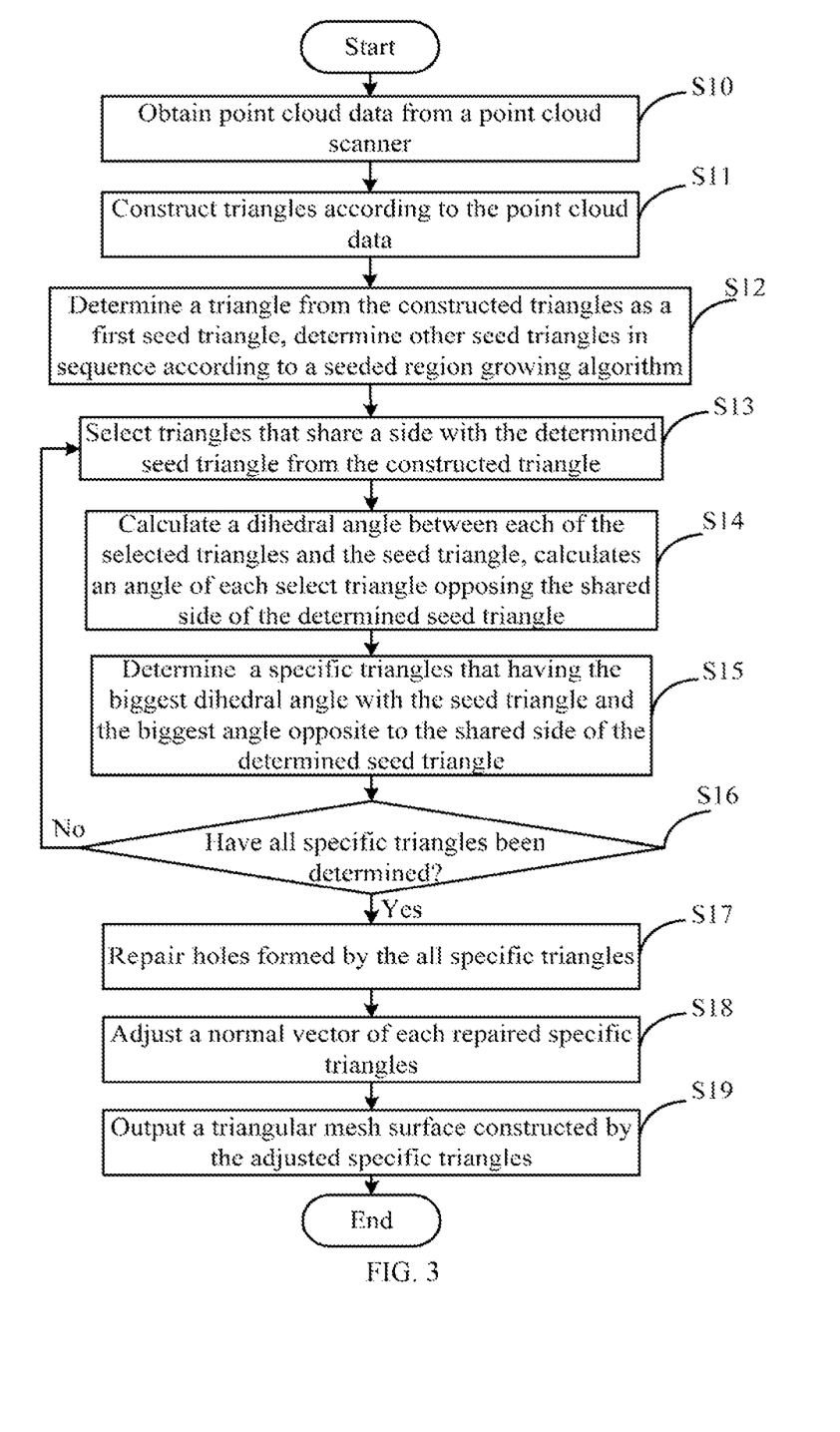
FIG. 3 is a flowchart of one embodiment of a method for constructing a triangular mesh surface of a point cloud.

FIG. 3 is a flowchart of one embodiment of a method for constructing a triangle mesh surface of a point cloud.

In block S10, the obtaining module 100 obtains point cloud data from the point cloud scanner 2.

In block S11, the construction module 101 construct triangles according to the point cloud data. The construction module 101 constructs a cubical quad containing all the point cloud data first. Next, the construction module 101 constructs a circumscribed tetrahedron around the cubical quad. Last, the construction module 101 inserts each point of the point cloud into the tetrahedron according to the three-dimensional coordinates of each point, and draws a line to connect each point in the tetrahedron with each vertex of the tetrahedron.

In block S12, the selection module 102 determines a triangle from the constructed triangles as a first seed triangle, determines other seed triangles in sequence according to a seeded region growing algorithm based on the first seed triangle.

In block S13, the selection module 102 selects triangles that share a side with the first seed triangle from the constructed triangle.

In block S14, the selection module 102 calculates a dihedral angle between each of the selected triangles and the first seed triangle, calculates an angle of each of the selected triangles opposite to the shared side of the first seed triangle.

In block S15, the selection module 102 determines a specific triangles that having the biggest dihedral angle with the first seed triangle and the biggest angle opposite to the shared side of the first seed triangle.

In block S16, the selection module 102 determines whether all specific triangles have been determined.

If the selection module 102 determines there is other specific triangles need to be determined, the procedure returns to block S13 for selecting triangles that share a side with the another determined seed triangle from the constructed triangle.

If the selection module 102 determines all specific triangles have been determined, in block S17, the repairing module 103 repairs holes formed by the all specific triangles. The repairing module 103 makes a circumscribed circle around each of the specific triangles includes no other points except three vertexes of the each of the specific triangles. The repairing module 103 further makes each side of each of the specific triangles merely shares with another specific triangle.

In block S18, the adjustment module 104 adjusts a normal vector of each of the specific triangles according to a principle that an angle between two normal vectors of each pair of adjacent triangles is less than a preset angle.

In block S19, the output module 105 outputs a triangular mesh surface constructed by the adjusted specific triangles.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. An electronic device, comprising:
a storage device;
at least one processor; and
a triangular mesh surface construction system and being executable by the at least one processor, the triangular mesh surface construction system comprising:
an obtaining module operable to obtain point cloud data from a point cloud scanner;
a construction module operable to construct triangles according to the point cloud data;
a selection module operable to determine a triangle from the constructed triangles as a first seed triangle, determine other seed triangles in sequence according to a seeded region growing algorithm based on the first seed triangle, select triangles that share a side with a determined seed triangle from the constructed triangles, determine a specific triangle having the biggest dihedral angle with the determined seed triangle and the biggest angle opposite to the determined shared side, determine whether all specific triangles have been determined;
a repair module operable to repair holes formed by the specific triangles by drawing lines to connect vertexes of the specific triangles if all specific triangles have been determined, making a circumscribed circle around each of the specific triangles comprising no other points except three vertexes of each of the specific triangles, and making each side of the specific triangles merely share with another specific triangle;
an adjustment module operable to adjust a normal vector of each of the specific triangles according to a principle that an angle between two normal vectors of each pair of adjacent triangles is less than a preset angle; and
an output module operable to output a triangular mesh surface constructed by the adjusted specific triangles.

2. The electronic device of claim 1, wherein the point cloud data comprises a three-dimensional coordinates of each point of the point cloud and a total number of the point cloud.

3. The electronic device of claim 1, wherein the construction module is further operable to construct a cubical quad containing all the point cloud data, construct a circumscribed tetrahedron around the cubical quad, insert each point of the point cloud into the tetrahedron according to the three-dimensional coordinates of each point, and draw a line to connect each point in the tetrahedron with each vertex of the tetrahedron.

4. The electronic device of claim 1, wherein the first seed triangle is a triangle comprises a vertex having a maximum X axis coordinate, a vertex having a maximum Y axis coordinate, or a vertex having a maximum Z axis coordinate.

5. The electronic device of claim 1, wherein the preset angle is 90°.

6. A method for constructing a triangular mesh surface of a point cloud, the method comprising:
   obtaining point cloud data from a point cloud scanner;
   constructing triangles according to the point cloud data;
   determining a triangle from the constructed triangles as a first seed triangle;
   determining other seed triangles in sequence according to a seeded region growing algorithm based on the first seed triangle;
   selecting triangles that share a side with a determined seed triangle from the constructed triangle;
   determining a specific triangle having the biggest dihedral angle with the determined seed triangle and the biggest angle opposite to the shared side of the determined seed triangle;
   determining whether all specific triangles have been determined;
   repairing holes formed by the specific triangles by drawing lines to connect vertexes of the specific triangles if all specific triangles have been determined, making a circumscribed circle around each of the specific triangles comprising no other points except three vertexes of each of the specific triangles, and making each side of the specific triangles merely share with an another specific triangle;
   adjusting a normal vector of each specific triangle according to a principle that an angle between two normal vectors of each pair of adjacent triangles is less than a preset angle; and
   outputting a triangular mesh surface constructed by the adjusted specific triangles.

7. The method of claim 6, wherein the point cloud data comprises a three-dimensional coordinates of each point cloud and a total number of the point cloud.

8. The method of claim 6, wherein the step "constructing triangles according to the point cloud data" further comprising:
   constructing a cubical quad containing all the point cloud data;
   constructing a circumscribed tetrahedron around the cubical quad;
   inserting each point of the point cloud into the tetrahedron according to the three-dimensional coordinates of each point;
   drawing a line to connect each point in the tetrahedron with each vertex of the tetrahedron.

9. The method of claim 6, wherein the first seed triangle is a triangle comprises a vertex having a maximum X axis coordinate, a vertex having a maximum Y axis coordinate, or a vertex having a maximum Z axis coordinate.

10. The method of claim 6, wherein the preset angle is 90°.

11. A non-transitory computer readable storage medium having stored thereon instructions that, when executed by a processor, cause the processor to perform a method for constructing a triangular mesh surface of a point cloud, the method comprising:
    obtaining point cloud data from a point cloud scanner;
    constructing triangles according to the point cloud data;
    determining a triangle from the constructed triangles as a first seed triangle;
    determining other seed triangles in sequence according to a seeded region growing algorithm based on the first seed triangle;
    selecting triangles that share a side with a determined seed triangle from the constructed triangle;
    determining a specific triangle having the biggest dihedral angle with the determined seed triangle and the biggest angle opposite to the shared side of the determined seed triangle;
    determining whether all specific triangles have been determined;
    repairing holes formed by the specific triangles by drawing lines to connect vertexes of the specific triangles if all specific triangles have been determined, making a circumscribed circle around each of the specific triangles comprising no other points except three vertexes of each of the specific triangles, and making each side of the specific triangles merely share with an another specific triangle;
    adjusting a normal vector of each specific triangle according to a principle that an angle between two normal vectors of each pair of adjacent triangles is less than a preset angle; and
    outputting a triangular mesh surface constructed by the adjusted specific triangles.

12. The non-transitory computer readable storage medium of claim 11, wherein the point cloud data comprises a three-dimensional coordinates of each point cloud and a total number of the point cloud.

13. The non-transitory computer readable storage medium of claim 11, wherein the step "constructing triangles according to the point cloud data" further comprises:
    constructing a cubical quad containing all the point cloud data;
    constructing a circumscribed tetrahedron around the cubical quad;
    inserting each point of the point cloud into the tetrahedron according to the three-dimensional coordinates of each point;
    drawing a line to connect each point in the tetrahedron with each vertex of the tetrahedron.

14. The non-transitory computer readable storage medium of claim 11, wherein the first seed triangle is a triangle comprising a vertex having a maximum X axis coordinate, a vertex having a maximum Y axis coordinate, or a vertex having a maximum Z axis coordinate.

15. The non-transitory computer readable storage medium of claim 11, wherein the preset angle is 90°.

* * * * *